(12) United States Patent
Laor et al.

(10) Patent No.: US 7,511,834 B2
(45) Date of Patent: Mar. 31, 2009

(54) OPTICAL APPARATUS FOR MEASURING TOOLING POSITION WITHIN A SEAMING MACHINE

(75) Inventors: Ofer Laor, Modyin (IL); Boris Molochnikov, Nesher (IL)

(73) Assignee: Quality by Vision Ltd., Yokneam Llit (IL)

( * ) Notice: Subject to any disclaimer, the term of this patent is extended or adjusted under 35 U.S.C. 154(b) by 0 days.

(21) Appl. No.: 10/597,040

(22) PCT Filed: Dec. 15, 2004

(86) PCT No.: PCT/IL2004/001132

§ 371 (c)(1),
(2), (4) Date: Jul. 7, 2006

(87) PCT Pub. No.: WO2005/065022

PCT Pub. Date: Jul. 21, 2005

(65) Prior Publication Data

US 2007/0013919 A1    Jan. 18, 2007

(30) Foreign Application Priority Data

Jan. 11, 2004    (IL) .................................... 159801

(51) Int. Cl.
    *G01B 11/14*    (2006.01)

(52) U.S. Cl. .................. 356/625; 356/601; 250/559.26; 72/10.7

(58) Field of Classification Search ......... 356/625–640, 356/601–623; 250/559.26; 72/14.1, 10.7, 72/37, 31.07
See application file for complete search history.

(56) References Cited

U.S. PATENT DOCUMENTS

| | | | | |
|---|---|---|---|---|
| 4,021,119 A * | 5/1977 | Stauffer | ...................... | 356/638 |
| 4,548,503 A * | 10/1985 | Liesch et al. | ................ | 356/621 |
| 4,821,544 A * | 4/1989 | Tamler et al. | ................ | 72/14.1 |
| 4,979,556 A * | 12/1990 | Braun et al. | ................ | 164/452 |
| 5,206,703 A * | 4/1993 | Holmes et al. | ............... | 356/625 |
| 2006/0078353 A1* | 4/2006 | Kosuge et al. | ............... | 399/176 |

* cited by examiner

*Primary Examiner*—Hoa Q Pham
(74) *Attorney, Agent, or Firm*—William H. Dippert; Eckert Seamans Cherin & Mellott (57) ABSTRACT

The present invention provides an optical device for measuring characteristics of toolings (116), especially chuck and roll in a seamer. The optical device comprises a radiation source (102) adapted to generate radiation, means (106, 108) for diverting the radiation so as to pass through a profile in the toolings (116), and a detector (114) adapted to receive the radiation that passed through the profile. The characteristics of the toolings (116) such as the profiles of a gap between the chuck and the roll, are processed from the detected radiation that passes through the profile.

14 Claims, 6 Drawing Sheets

OPTICAL APPARATUS FOR MEASURING TOOLING POSITION WITHIN A SEAMING MACHINE

FIELD OF THE INVENTION

The present invention relates to optical devices. More particularly, the present invention relates to an optical apparatus for measuring parameters related to toolings, relative distance and quality.

BACKGROUND OF THE INVENTION

Seamers are used in the industry for closing beverage, food, and aerosol cans, as well as other enclosures such as oil drums, oil filters and even capacitor enclosures, before and after these containers are filled. Seaming the cans has been known in the industry for decades and ensures that the closure between the can's cover and the can's body is sealed and safe enough so that the content does not leak and outside hazards cannot enter the enclosure through the seams. There is no contact of heat, dirt, or hazardous materials with the contents of the enclosure by using seaming methods.

In present-day seamers, there are two phases during the seaming process. A chuck is a tooling that operates within the seamer and holds the can (a container or enclosure) in position while the seamer is turning. A first operation roll then approaches the can and pushes the body and cover into one another while rotation performs the operation around the circumference of the can. At this point, the first operation roll moves away and a second operation roll, with a different profile shape exerts pressure on the cover and body so that the final seam is tight enough and that it is sealed properly.

Seamers often have more than one head so that several cans can be closed simultaneously. Each one of the head's chuck and rolls are at intermediate positions during the seaming process.

With today's high speed manufacturing requirements, seamers as well as other procedures that take part in the filling and manufacturing of cans are expected to increase in speed. As speeds increase, there are more potential problems with the seams due to the inaccurate positioning of the tooling with reference to one another (one tooling against the other) during the seaming procedure.

Once a problem in a seamer is detected, the seamer must be completely stopped (all heads are affected) and the appropriate manufacturing head's tooling must be adjusted. The cans that were incorrectly seamed must be located and thrown away (most likely, it is too late and the cans manufactured by a particular head and many more than necessary are thrown away). The incorrectly positioned tooling must be quickly adjusted in order to continue the manufacturing process.

In addition, tight clearances, which are the distances between the chuck and rolls, may cause friction between the roll and the chuck and could cause one or the other to shatter—which might damage the seamer and possibly introduce dangerous material into the cans. Tight clearances might also exert unnecessary pressure on the seams, which could cause the seam to weaken, or even ultimately break, or be misshapen in a way that could damage the users (e.g., by scratching them).

Clearances that are not tight enough could cause an open seam, which might introduce hazards into the enclosure, or allow the contents of the enclosure to escape or be contaminated.

Small initial variations in the distances between the rolls and the chuck throughout the seamer heads will increase due to the pressures exerted on the tooling during the manufacturing process. Over time, the variations between the heads will increase substantially. This will result in subsequently having to stop the seamer several times, once for each head that has gone out of alignment, instead of once for all the heads.

Measurements of the distances between the toolings are done in the apex of the motion of the roll against the chuck. This is the point where the toolings are at the closest possible position to each other during the manufacturing process. The seamer manufacturer marks the specific position on the seamer (there is a range where the distance will not change, wherein this distance approximately equals the circumference of the can being seamed).

The state of the art methods of measuring tooling characteristics are as follows:

1. Measuring the thickness, which is the smallest distance through the range of motion between the roll and the chuck, by inserting feeler gauges (also known as filler gauges) between the roll and the chuck tooling. If a feeler gauge (larger than the specific distance) cannot be inserted between the tooling and a second feeler gauge (smaller than the specific distance) can be inserted between the tooling—the distance is assumed to be correct. This method is subjective as it is too difficult to accurately verify that the distance is within the specification after the use of feeler gauges.
2. Measuring the clearance, which is the vertical position of the chuck and the roll. The clearance is usually measured by measuring a point on the roll against a reference point. Then, the chuck's known position is measured against the same reference point (usually the can holder platform). The difference between the two measurements is a representation of the vertical distance between the roll and chuck. This method is complex and almost impossible to perform accurately as small inaccuracies on the roll itself or in the gauge can cause a major inaccuracy in the measurements. Both the clearance and thickness measurements are interactive—modifying one can easily alter the other, so measuring them and adjusting them individually, as it is done today, is incorrect and inaccurate.

This procedure must be carried out separately for the first and second operation rolls and the chuck for each head. The procedure is relatively long; thus stopping the manufacturing process for a relatively long period of time. At the same time, the procedure is prone to inaccuracies and disadvantages such as: mistakes in the first operation roll position are not apparent and can cause issues that are difficult if not impossible to detect and correct; Because of production requirements, it is often impossible to remove second operation rolls once they are installed (in order to reposition the first operation rolls); Experienced operators are needed; The procedure does not allow determination of the optimal positions of the rolls and chucks in order to produce correct seams; The procedure is expensive since many cans are thrown away; Finally, the procedure is extremely time consuming.

It is a long felt need to provide a method for measuring the distance between the tooling and the clearance that is efficient and quick. According to the present invention, use of an optical device is highly efficient and accurate as well as relatively quick and economical due to eliminating both the need to remove rolls and the need to throw away excessive amount of cans.

The use of optical devices for evaluating and inspecting surfaces, profiles, and dimensions is known in the industry. Devices that are relevant to the present invention are profilers. Profilers based on light projection are also known. An example is disclosed in patent U.S. Pat. No. 4,983,043 "High accuracy structured light profiler", filed by Harding in 1988. This optical gauging system for evaluating the surface shape includes an illumination system which projects a line of light onto a work piece surface, a viewing system focused along that line. The focused line is imaged onto a linear detector array. A translation mechanism is also provided so that the relation between the translation mechanism and the output of the array is related to the profile shape. A method for measuring contours is disclosed in U.S. Pat. No. 5,612,786 "Contour measurement system" filed by Huber in 1995. The optical system is activated to obtain a set of data that is being optimized and calibrated so as to obtain the contours of a three dimensional object.

Another example of a profiler is in U.S. Pat. No. 5,986,745 "Co-planar electromagnetic profile scanner", filed by Hermary in 1997. This co-planar system for determining the shape and dimensions of a surface of an object includes a projector, a receiving device and a discriminator for determining which portion of the reflected pattern corresponds to which portion of the projected pattern. The resulting signals and correlations are used to calculate the shape and dimensions of the object.

None of the above mentioned optical devices as well as other devices can be applied for determining the distance and clearance between the first and second operation rolls and the chucks of the present invention. There was a need to establish an optical device by which the distance between the tooling in the seamer can be accurately determined, while the chuck and the rolls are installed in the seamer.

SUMMARY OF THE INVENTION

It is an object of the present invention to provide an optical device for measuring tooling characteristics especially designed for measuring the profile characteristics of the gap between a chuck and a roll in a seamer.

It is another object of the present invention to provide an optical device for measuring tooling characteristics in a relatively narrow area while maintaining little or no distortion of the light adapted to carry the resulted information.

Therefore, and in accordance with a preferred embodiment of the present invention, there is provided an optical device for measuring characteristics of toolings, said optical device comprising:

a radiation source adapted to generate radiation;
means for diverting said radiation so as to pass through a profile in the toolings;
detector adapted to receive said radiation that passed through the profile;
whereby the characteristics of the toolings are processed from the detected radiation that passes through the profile.

Furthermore, in accordance with another preferred embodiment of the present invention, the toolings are chuck and roll in a seamer and the characteristics are the profiles of a gap between the chuck and the roll.

Furthermore, in accordance with another preferred embodiment of the present invention, said radiation is selected from a group consisting of electromagnetic radiation, light radiation or laser light.

Furthermore, in accordance with another preferred embodiment of the present invention, said optical device further comprises at least one beam expander so as to generate a coherent beam.

Furthermore, in accordance with another preferred embodiment of the present invention, said at least one beam expander is comprised of two lenses that expand the beam with a minimal dissipation.

Furthermore, in accordance with another preferred embodiment of the present invention, said means for diverting said radiation is selected from a group of diverters such as mirror, lens, or fiber-optic.

Furthermore, in accordance with another preferred embodiment of the present invention, said means for diverting the radiation is a prism.

Furthermore, in accordance with another preferred embodiment of the present invention, a first prism diverts the radiation towards the profile and wherein said second prism diverts the radiation that passes through the profile.

Furthermore, in accordance with another preferred embodiment of the present invention, said detector and said source are positioned side by side and said first prism and said second prism are positioned in a predetermined distance and opposite to one another so as to form a bypass of said radiation.

Furthermore, in accordance with another preferred embodiment of the present invention, said optical device further comprises a magnification system adapted to receive radiation that passes through the profile and transfers it so as to hit said detector.

Furthermore, in accordance with another preferred embodiment of the present invention, said detector is a CCD camera, CMOS camera, or another type of digital or analog radiation detector.

Furthermore, in accordance with another preferred embodiment of the present invention, characteristic of toolings is a distance between the toolings.

Furthermore, in accordance with another preferred embodiment of the present invention, characteristic of toolings is a clearance between the toolings, shape of toolings, or distances in the gap between toolings.

It is thus provided in accordance with yet another preferred embodiment of the present invention a method for measuring characteristics of toolings comprising:

providing a radiation source adapted to generate radiation;
providing a first means for diverting said radiation so as to pass through a profile of the gap between the toolings;
providing a second means for diverting said radiation that passes through the profile;
directing the diverted radiation to a detector;
whereby the characteristics of the toolings is processed from the detected radiation that passes through the profile.

Furthermore, in accordance with another preferred embodiment of the present invention, said radiation is selected from a group consisting of electromagnetic radiation, light radiation or laser light.

Furthermore, in accordance with another preferred embodiment of the present invention, the toolings are chuck and roll in a seamer and the characteristics are the profiles of a gap between the chuck and the roll.

additionally, in accordance with another preferred embodiment of the present invention, said first means for diverting and said second means for diverting said radiation are selected from a group comprising diverters such as prism, mirror, lens, or fiber-optic.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and claims.

DETAILED DESCRIPTION OF THE INVENTION AND FIGURES

The present invention provides a new and unique means for measuring profiles of tooling so as to establish characteristics such as distance and clearance, especially for quantifying the performance of tooling in seamers. The methods used nowadays for measuring the distance and the clearance in seamers so as to provide quality estimates are prone to inaccuracies as well as time consuming and costly. It has been a long felt need in the industry to provide an accurate method that will establish quick and accurate quality results for the seams produced by the seamers.

Figure 1:
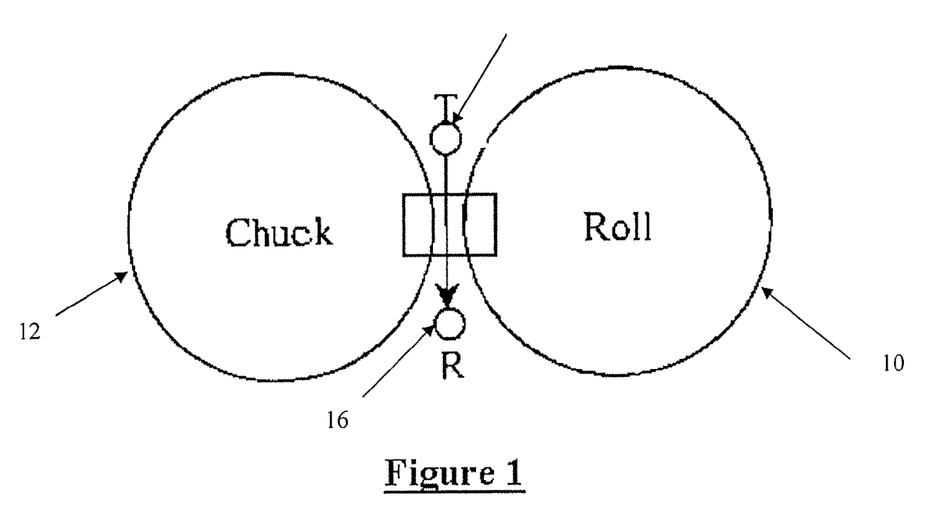
FIG. 1 illustrates a schematic top representation of a roll and a chuck for which profiles and distances have to be measured by the represented projected light in accordance with the physical principle of the present invention.

Reference is made to FIG. 1 illustrating a schematic top representation of a roll and a chuck for which profiles and distances have to be measured by the represented projected light in accordance with the physical principle of the present invention. The basis of the method of the present invention is establishing a shadow-graph by which a two-dimensional profile of the area between a specific roll and chuck, the gap between them, is produced. In FIG. 1, the top view illustrates a roll 10 and a chuck 12. Light is transmitted between roll 10 and chuck 12 from point 14 to point 16. Roll 10 and chuck 12 partially blocks the light so as to allow only light that passes through the gap between them to reach point 16 and to establish a shadow-graph.

It is optional to use any kind of electromagnetic radiation such as light or laser to be transmitted from point 14 while the electromagnetic waves that pass between roll 10 and chuck 12 are collected in point 16 using any type of detector according to the type of radiation used. The detector that receives and detects the radiation will produce a profile of the gap between roll 10 and chuck 12 in two axes: a vertical axis through which the clearance is measured, and a horizontal axis through which the thickness is measured. At the point where the seamer is positioned, the thickness is the minimal thickness distance between the roll and the chuck.

Due to requirements to perform the quality examination while the seamer's heads have already been installed, there was a need to produce an optical apparatus in which the light passes through the gap between the tooling without having the whole apparatus in the gap since there is no room for the whole apparatus. Therefore, the optical apparatus of the present invention has means to divert the electromagnetic radiation into the gap with little or no distortion.

Figure 2:
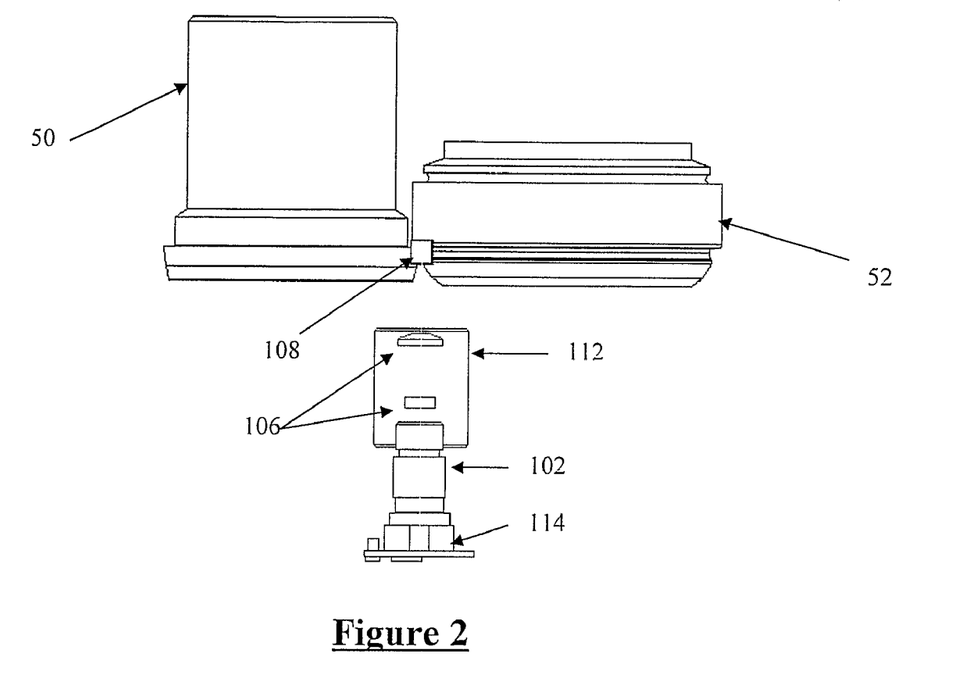
FIG. 2 illustrates a schematic frontal view of an optical device for measuring tooling characteristics in accordance with a preferred embodiment of the present invention, positioned between a chuck and a roll from which characteristics are taken.

Reference is now made to FIG. 2 illustrating a frontal view of an optical device for measuring tooling characteristics in accordance with a preferred embodiment of the present invention, positioned between a chuck and a roll from which characteristics are taken. Chuck 50 and roll 52 are installed in a seamer (the machinery itself is not shown in the figures) side by side while the rolls (a first operation roll and then a second operation roll) approach the can (the can is not shown in FIG. 1) and pushes it into one another while rotating about the circumference of the can to ensure that the closure is indeed secure. As mentioned herein before, qualitatively characterizing the profile between the roll and the chuck is enormously significant in order to assure the closure of the can. Optical device 100 is positioned between chuck 50 and roll 52 while prisms 108 and 110 are positioned on both sides of the chuck and the gap between the roll in the height of the point being measured (only one prism is shown in FIG. 2, the other one is concealed by the frontal one). This Figure illustrates the positioning of the optical device of the present invention relative to the chuck and the roll.

Figure 3A:
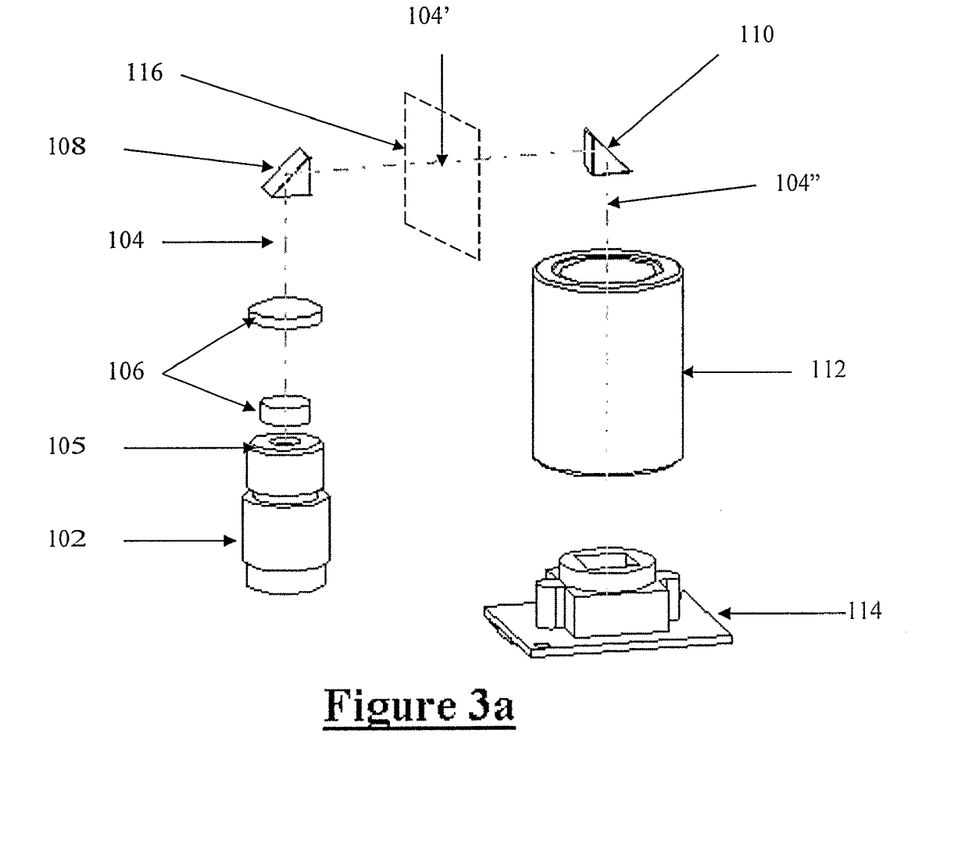
FIGS. 3a-c illustrate an isometric, side and frontal view of the optical device for measuring tooling characteristics shown in FIG. 2.

In order to better understand the mechanism of the optical device of the present invention, reference is now made to FIGS. 3a, b, and c illustrating isometric, side and frontal views of the optical device for measuring tooling characteristics shown in FIG. 2. A light transmitter, possibly having a laser light source 102, transmits light upwardly. A doted line 104 indicates the direction of the beam. The transmitted light can be any electromagnetic radiation.

Figure 3B:
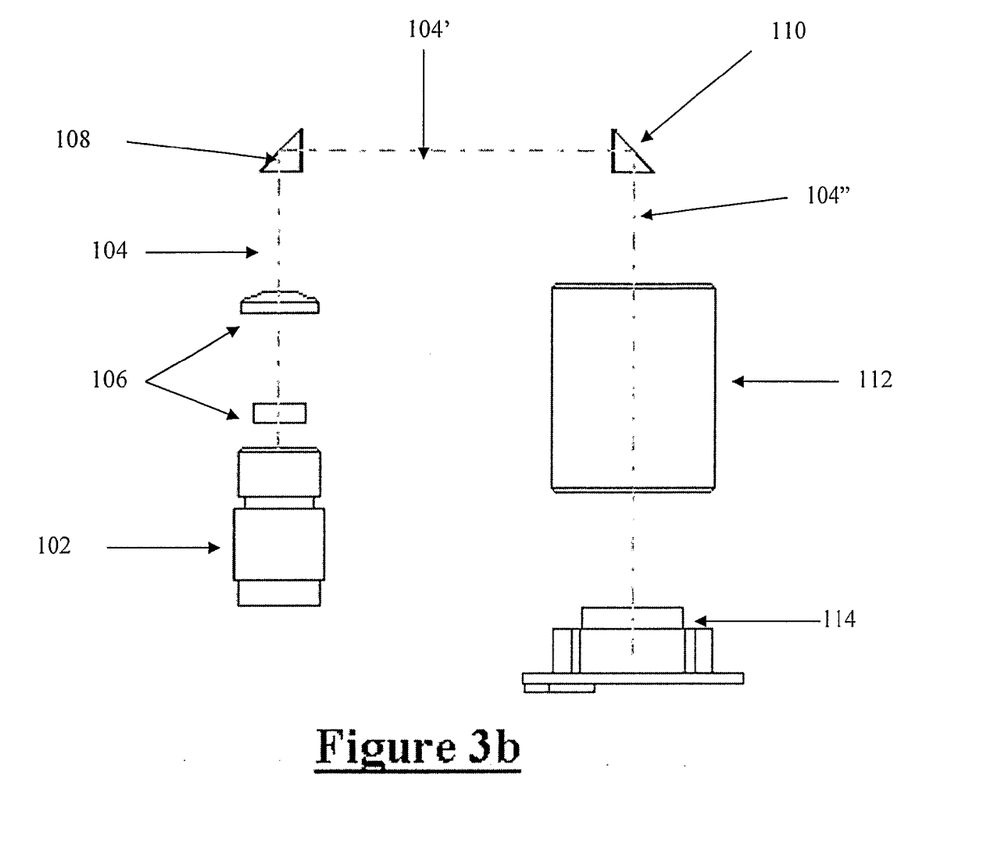
Figure 3C:
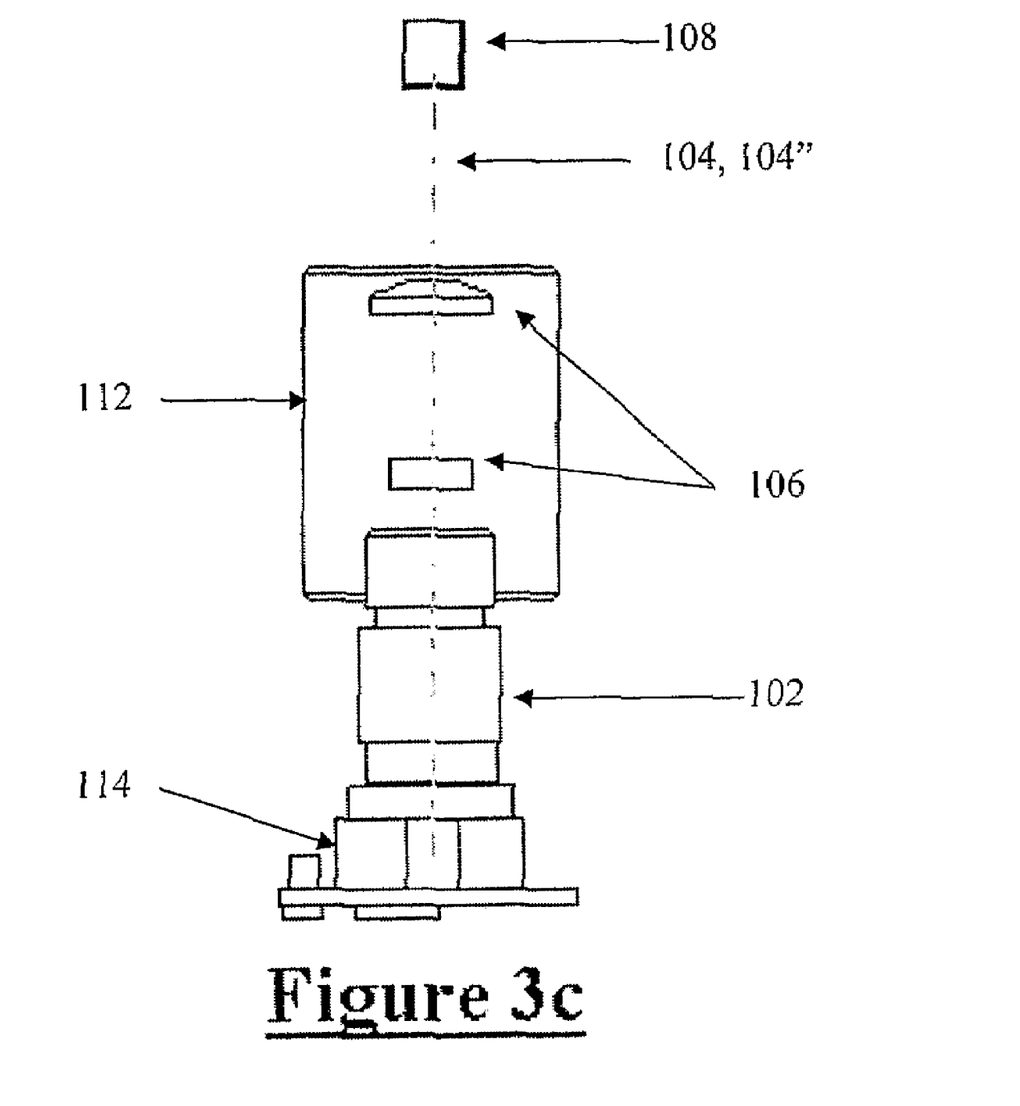

The light projected of laser light source 102 is collimated as it emerges from opening 105 (shown clearly in FIG. 3a) and then passes through beam expander. The beam expander is comprised of two lenses 106 that expand the beam with a minimal dissipation. Lens 106 produces and directs a coherent light beam that hits a first prism 108. First prism 108 diverges the direction of the beam from 104 to 104' in substantially 90 degrees, so that the beam hits a second prism 110, positioned opposite first prism 108. The objects to be measured 116, in this case, the roll and the chuck (not shown in FIG. 3) is placed in the pathway of the projected radiation substantially in the center of direction of line 104', where the measurement is taken. The positioning of the object to be measured is shown in FIG. 3a.

It should be noted that other techniques for beam expansion can be used and are covered by the scope of the present invention. Beam expansion may not be necessary when a suitable electromagnetic radiation source is used that has a sufficiently large diameter of radiation that can encompass the area being probed.

Returning to FIG. 2, first prism 108 and second prism 110 (obscured by the first prism) are positioned horizontally in the level of the measuring point between roll 52 and chuck 50. The measured point where the profiles to be characterized are provided is placed in the axis between the prisms—in direction 104' of the laser light. The beam projected from first prism 108 to second prism 110 passes through the gap between chuck 50 and roll 52. Such arrangement of the prisms prevents the system from producing a distorted view of the area between the roll and the chuck. Another significant advantage of the arranged apparatus is that the measurement is performed whilst the roll and the chuck are installed within the seamer and there is no need to remove them. Since the measurement is performed within the seamer, the adjustment can be performed as the system provides a measurement result. This allows a quick and easy deterministic adjustment of the roll against the chuck.

Reference is made again to FIG. 3. Second prism 110 diverts the direction of the laser light 104' downwards in the direction indicated by dotted line 104". The resulting light that passes through this line already carries information regarding characteristics of the gap between the chuck and the roll since the only light that can pass through this gap will be received by second prism 110 and be diverted downwards. Light that does not pass through the gap will reflect outwards and will not interfere with the measurements.

First prism 108 and second prism 110 basically act as a transmission medium for the light and since there is no room for the light source or the detector in the area to be detected only the gap between the chuck and the roll will be measured. Other means to divert and transmit the light from one side of the area to be detected to the other side can be used. Optionally, mirrors can be used so as to establish the routing of the light from the source to the detector. Another alternative is to use a fiber-optic technique or lenses in order to divert and transmit the light freely through the gap between the chuck and the roll. Every available technique to divert the light or the electromagnetic radiation to the measured area and from it may be used in order to build the apparatus of the present invention. Every such diverting means is covered by the scope of the present invention. Optionally, the light can be produced within the opening itself, this option as well as others is also covered by the scope of the present invention.

The light projected from second prism 110 passes through magnification system 112 that comprises magnification lenses. The system can be a regular system that is used in optical devices so as to facilitate the interpretation of the results. Eventually, the resulting light hits an electromagnetic detector, preferably CCD camera 114. Other detecting means for electromagnetic radiation can be used in order to digitize the results such as camera or CMOS camera that are covered by the scope of the present invention. CCD camera 114 collects the results from the light that carries information regarding characteristics of the gap between the chuck and the roll, preferably in the shape of a shadow graph; thus revealing the characteristics of the vertical dimension—the clearance and the horizontal dimension—the thickness. The digitized data is interpreted through suitable software (not shown in the figures) and is displayed as the clearance and thickness, either automatically or through the aid of an operator.

It should be noted that different measurement values (e.g., clearance and thickness) may be separately measured at different positions along the motion of the seamer, where it may be most appropriate (where the image might be clearer) or comfortable for the operator to perform these measurements without significantly skewing the measurement results of these values.

Figure 4:
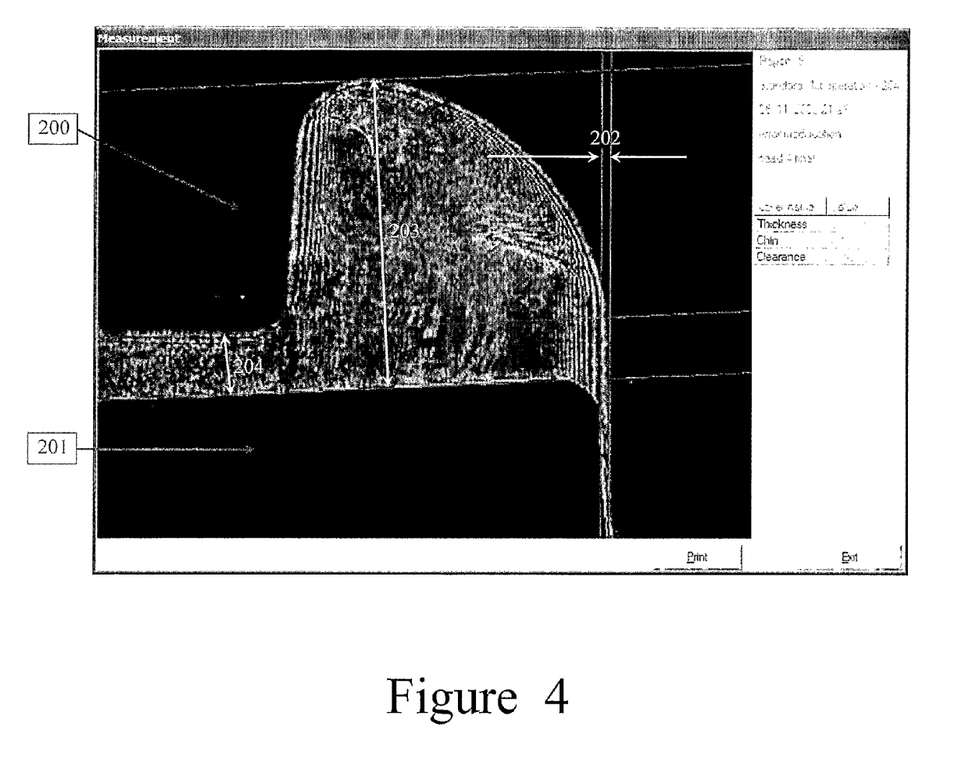
FIG. 4 illustrates a shadow-graph resulting from the present invention's measurement of tooling using an optical device for measuring tooling characteristics.

Reference is now made to FIG. 4 illustrating a shadowgraph resulting from a measurement of tooling using an optical device for measuring tooling characteristics in accordance with a preferred embodiment of the present invention. The shadow indicated by 200 is the shadow of a chuck. The shadow indicated by 201 is the shadow of a roll. Both roll and chuck are in a seaming machine. The brighter area is the gap between chuck 200 and roll 201. The characteristics that are measured between the chuck and the roll are the thickness (the distance) that is indicated by double headed arrow 203, the clearance that is indicated by two arrows 202 and a chin indicated by double headed arrow 204. As can be seen, the measured characteristics, which are indicated in a table on the right, have very small dimensions; however, the results are very accurate.

It is emphasized that other features characterizing the profile between the chuck and the roll can be measured such as the shape of the profile of the chuck or of the roll, as well as radius, angles or distances of shapes formed between the chuck and the roll. Any characteristic that provides quantitative information regarding the gap between the roll and the chuck is covered by the scope of the present invention.

It should be noted that the measurements of clearance and thickness are very quick and accurate using the present invention. This is due to the fact that the measurement is performed directly on the chuck and roll when they are in their actual positions. The measurements can be performed on the first operation roll as well as on the second operation roll. According to the methods that are presently the state of the art, the measurements are performed indirectly, on the final product, using inaccurate and time-consuming methods. Present methodology interprets first-operation positions from the resulting seam, as these results are not being directly measured.

The apparatus for measuring quality of tooling of the present invention provides accurate results regarding the characteristics of the chuck and the rolls and significantly facilitate the reduction of initial variations between the seamer's heads. The reduction in the variations between the heads will produce much more homogenous stopping rates from the different heads. While using the methods used presently, when a specific head goes out of specification, it's most likely that the entire seamer (all of the heads) will require readjustment and not just the specific defective head. By reducing the number of production stops for head readjustment, the final product is much more reliable and bears fewer faults. This will result in more economical procedures.

The accurate method of the present invention will facilitate predicting when the seamer has to go through a quality check stop. This prediction will allow the companies to forecast these manufacturing stops and perform them at their convenience.

It should be clear that the description of the embodiments and attached Figures set forth in this specification serves only for a better understanding of the invention, without limiting its scope as covered by the following claims.

It should also be clear that a person skilled in the industry, after reading the present specification can make adjustments or amendments to the attached Figures and aforementioned embodiments that would still be covered by the following claims.

The invention claimed is:

1. A device for measuring characteristics of a gap between a chuck and a roll in a seamer, said device comprising:
   a radiation source capable of generating radiation;
   a diverter for diverting said radiation so as to pass through a profile in the gap between a chuck and a roll in a seamer; and
   a two-dimensional array detector capable of receiving said radiation that passed through the profile,
whereby the characteristics of the profile of the gap are processed from the detected radiation that passes through the profile.

2. The device as claimed in claim 1, wherein said radiation is selected from the group consisting of electromagnetic radiation, light radiation, and laser light.

3. The device as claimed in claim 1, further comprising at least one beam expander so as to generate a coherent beam.

4. The device as claimed in claim 3, wherein said at least one beam expander is comprised of two lenses that expand the beam with a minimal dissipation.

5. The device as claimed in claim 1, wherein said diverter is selected from the group consisting of a prism, mirror, lens, and fiber-optic.

6. The device as claimed in claim 1, wherein said diverter is a prism.

7. The device as claimed in claim 6, wherein a first prism diverts the radiation towards the profile and wherein a second prism diverts the radiation that passes through the profile.

8. The device as claimed in claim 7, wherein said two-dimensional array detector and said source are positioned side by side and said first prism and said second prism are positioned in a predetermined distance and opposite to one another so as to form a bypass of said radiation.

9. The device as claimed in claim 1, wherein said two-dimensional array detector is a CCD camera.

10. The device as claimed in claim 1, wherein the characteristics of the gap are a distance between the chuck and the roll.

11. The device as claimed in claim 1, wherein the characteristics of the gap are the clearance between the chuck and the roll.

12. A method for measuring characteristics of a gap between a chuck and a roll in a seamer comprising:
    providing a radiation source capable of generating radiation;
    providing a first diverter for diverting said radiation so as to pass through a profile in the gap;
    providing a second diverter for diverting said radiation that passes through the profile; and
    directing the diverted radiation to a two-dimensional array detector,
whereby the characteristics of the profile are processed from the detected radiation that passes through the profile.

13. The method as claimed in claim 12, wherein said radiation is selected from the group consisting of electromagnetic radiation, light radiation, and laser light.

14. The method as claimed in claim 12, wherein said first diverter and said second diverter are selected from the group consisting of a prism, mirror, lens, and fiber-optic.

* * * * *